Oct. 9, 1923.
L. N. THOMPSON
TURBINE BLADING
Filed Oct. 6, 1922
1,469,973
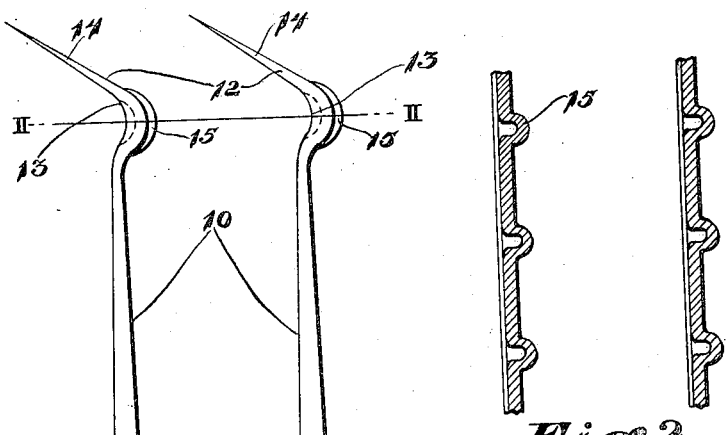
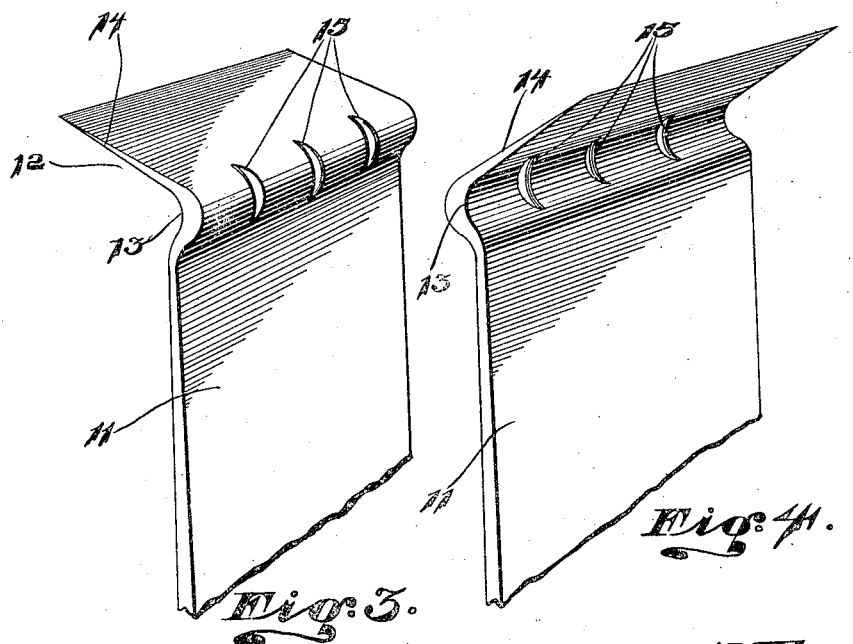
L. N. Thompson
INVENTOR
WITNESSES:
W. S. Beckley
R. C. B. Wakefield
BY D. C. Davis
ATTORNEY Patented Oct. 9, 1923.

1,469,973

UNITED STATES PATENT OFFICE.

LOUIS N. THOMPSON, OF MOORE, PENNSYLVANIA, ASSIGNOR TO WESTINGHOUSE ELECTRIC AND MANUFACTURING COMPANY, A CORPORATION OF PENNSYLVANIA.

TURBINE BLADING.

Application filed October 6, 1922. Serial No. 592,791.

*To all whom it may concern:*

Be it known that I, LOUIS N. THOMPSON, a citizen of the United States, and a resident of Moore, in the county of Delaware and State of Pennsylvania, have invented a new and useful Improvement in Turbine Blading, of which the following is a specification.

My invention relates to elastic-fluid turbines, and more particularly to blading therefor of the peripheral-discharge type, and it has for its object to provide blading of this character which shall be balanced, of a light construction, and adequately strong.

Apparatus made in accordance with my invention is illustrated in the accompanying drawings, forming a part of this application, in which: Fig. 1 is a fragmentary view of two adjacent blade elements of my improved type; Fig. 2 is a sectional view taken along the line II—II of Fig. 1; and Figs. 3 and 4 are perspective views of turbine blade elements constructed in accordance with my invention.

In the application of Alexander T. Kasley, Serial No. 486,517, filed July 19, 1921, continued as Serial No. 521,872, filed December 12, 1921, and assigned to the Westinghouse Electric and Manufacturing Company, there is disclosed and claimed a type of peripherally-discharging turbine blade having an inner substantially flat or radial portion and an outer spoon-outline tip including a curved or trough portion and a rearwardly-extending portion. The rearwardly-extending portions and the curved or trough portions define passages for the discharge of motive fluid. In this construction, the trough or curved portions are thickened in order to secure balance of the blades and to provide sufficient strength to resist bending stresses due to the rearwardly-extending portions.

My invention consists in an improvement of blading of the character referred to, whereby it may be made lighter with the preservation of blade balance and adequate strength. More particularly, my invention comprises blades of the character referred to which have ribs or masses extending forwardly of the curved or trough portions of the spoon-outline tips in order to balance the rearwardly-extending portions thereof as well as to afford a section which is more resistive to bending stresses due to the rearwardly-extending portions. Preferably, the forwardly extending protuberances or masses are provided by indenting the curved or trough portions in order to provide ribs which extend forwardly of the blades for the purposes referred to.

Referring now to the drawings for a more detailed description of my invention, I show a plurality of turbine blades 10 having inner radial or substantially flat portions 11 and outer spoon-outline tips 12, which define rearwardly extending passages for the peripheral discharge of motive fluid. The spoon-outline tips 12 include curved or trough portions 13 and rearwardly-extending portions 14.

The blades are provided at the forward sides thereof with forwardly-projecting ribs, masses, or protuberances 15, which preferably extend transversely of the curved or trough portions 13, both for the purpose of balancing the rearwardly extending portions 14 as well as of presenting a better area to resist bending stresses due to the rearwardly-extending portions 14. The ribs, masses, or protuberances 15 are preferably provided by indenting each blade transversely of the curved or trough portion by a suitable die; and, as the blades are preferably manufactured by drop-forging, it will be apparent that the indentation of the curved or trough portions may be made an incident of the process of manufacture.

From the foregoing, it will be apparent that the transverse ribs or projections 15 at the forward sides of the blades 10 not only serve to balance the blades with respect to centrifugal moments but also to strengthen the latter so as to make them more resistant to the effects of bending stresses due to the rearwardly projecting portions 14. By the use of my construction, it is, therefore, possible to make turbine blades of the spoon-outline type which are relatively light, well balanced, and of sufficient strength.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:

1. In a turbine, a row of blades having outer portions extending rearwardly to define discharge passages for motive fluid and protruding masses at the forward sides of the blades to counter-balance the rearwardly-extending portions.

2. In a turbine, a row of blades having inner substantially flat portions and outer rearwardly-extending portions which define discharge passages for motive fluid and protruding masses at the forward sides of the blades to counter-balance the rearwardly-extending portions.

3. In a turbine, a row of blades having discharge portions of the spoon-outline type and protruding masses at the forward sides of the spoon-outline portions.

4. In a turbine, a row of blades having spoon-outline portions defining discharge passages for motive fluid, each of the blades being radially indented to provide forwardly-extending masses to counter-balance the rearwardly-extending portions of the spoon-outline portions.

5. In a turbine, a row of blades having outer curved and rearwardly extending portions, each of the blades being indented transversely of the curved portions to provide forwardly extending ribs which counter-balance the rearwardly-extending portions and strengthen the blade where submitted to the greatest bending stress due to the rearwardly-extending portions.

6. In a turbine, a row of blades having inner substantially flat portions and outer curved and rearwardly-extending portions and protruding masses at the forward sides of the curved portions to counter-balance the rearwardly-extending portions.

7. A turbine blade having outer curved and rearwardly-extending portions and a counter-balancing mass at the forward side of the curved portion to counter-balance the rearwardly-extending portion.

8. A turbine blade having outer curved and rearwardly-extending portions and indentations extending transversely of the curved portion to provide forwardly-extending protruding masses for counter-balancing the rearwardly-extending portions.

9. A turbine blade having outer curved and rearwardly extending portions and an indentation extending transversely of the curved portion to provide a forwardly-extending mass for counter-balancing the rearwardly-extending portion and to strengthen the blade where submitted to maximum bending stresses due to the rearwardly extending portion.

In testimony whereof, I have hereunto subscribed my name this 29th day of September, 1922.

LOUIS N. THOMPSON.